(12) United States Patent
Said et al.

(10) Patent No.: US 11,799,364 B2
(45) Date of Patent: Oct. 24, 2023

(54) ELECTRIC PROPULSION SYSTEM HAVING INTEGRATED ELECTRICAL AND THERMAL ARCHITECTURE AND RELATED METHODS OF OPERATING AND IMPLEMENTING SAME

(71) Applicant: Kaney Aerospace, Inc., Rockford, IL (US)

(72) Inventors: Waleed Said, Rockford, IL (US); Michael Andres, Rockton, IL (US); Adam White, Beavercreek, OH (US)

(73) Assignee: Kaney Aerospace, Inc., Rockford, IL (US)

(*) Notice: Subject to any disclaimer, the term of this patent is extended or adjusted under 35 U.S.C. 154(b) by 10 days.

(21) Appl. No.: 17/243,225

(22) Filed: Apr. 28, 2021

(65) Prior Publication Data

US 2021/0344255 A1 Nov. 4, 2021

Related U.S. Application Data

(60) Provisional application No. 63/017,956, filed on Apr. 30, 2020.

(51) Int. Cl.
 *H02K 9/22* (2006.01)
 *H02K 21/00* (2006.01)
 *H02K 9/19* (2006.01)

(52) U.S. Cl.
 CPC .............. *H02K 9/227* (2021.01); *H02K 9/19* (2013.01); *H02K 9/225* (2021.01); *H02K 21/00* (2013.01)

(58) Field of Classification Search
 CPC .. H02K 9/00; H02K 9/19; H02K 9/20; H02K 9/22; H02K 9/225; H02K 9/227; H02K 21/00; H05K 7/2029; H05K 7/20936; H05K 7/203
 See application file for complete search history.

(56) References Cited

U.S. PATENT DOCUMENTS

| | | | |
|---|---|---|---|
| 4,772,980 A | 9/1988 | Curtis et al. | |
| 8,283,818 B2 * | 10/2012 | Hassett | H02K 9/225 310/58 |
| 9,414,520 B2 | 8/2016 | Campbell et al. | |
| 9,555,711 B2 | 1/2017 | White et al. | |
| 9,812,243 B2 | 11/2017 | White et al. | |
| 10,138,899 B2 | 11/2018 | Joubert et al. | |
| 10,667,434 B1 | 5/2020 | Mao et al. | |
| 10,925,188 B1 | 2/2021 | Keehn et al. | |
| 2016/0028341 A1 | 1/2016 | White | |
| 2020/0007007 A1 * | 1/2020 | Haran | H02K 1/16 |
| 2020/0093025 A1 * | 3/2020 | Enright | B25J 11/00 |

* cited by examiner

*Primary Examiner* — Tulsidas C Patel
*Assistant Examiner* — Joshua Kiel M Rodriguez
(74) *Attorney, Agent, or Firm* — Amundsen Davis, LLC

(57) ABSTRACT

Electric propulsion systems, and methods of operating and implementing same, are disclosed herein. In one example embodiment, an electric propulsion system includes an electric motor, a motor drive coupled to the electric motor, and a thermal management subsystem. The electric motor is a permanent magnet synchronous motor, and the motor drive includes each of an inverter including a plurality of wide bandgap semiconductor field effect transistors (FETs), and a controller coupled at least indirectly to the FETs and configured to control the FETs by way of pulse width modulation (PWM) control. Additionally, at least a first portion of the electric motor and at least a second portion of the motor drive are cooled by the thermal management subsystem.

20 Claims, 12 Drawing Sheets

ELECTRIC PROPULSION SYSTEM HAVING INTEGRATED ELECTRICAL AND THERMAL ARCHITECTURE AND RELATED METHODS OF OPERATING AND IMPLEMENTING SAME

CROSS-REFERENCE TO RELATED APPLICATIONS

This application claims the benefit of U.S. provisional patent application No. 63/017,956 entitled "An Integrated Electrical and Thermal Architecture for Electric Propulsion Systems" filed on Apr. 30, 2020, which is hereby incorporated by reference herein.

FIELD OF THE INVENTION

The present invention relates to electric propulsion systems such as those which can be employed in aircraft or other vehicles and related methods of operation and implementation, and more particularly relates to such systems and related methods that include or employ thermal management systems (or subsystems), as well as to such thermal management systems and related methods of operation and implementation.

BACKGROUND OF THE INVENTION

Electric propulsion systems including electric motors and electric motor drives of various types have long been available. In recent years, electric propulsion systems have become more commonly implemented in a variety of applications, including automotive applications, particularly as a result of improvements in electric storage technologies such as batteries. Indeed, it is increasingly envisioned that in the coming years electric propulsion systems will surpass internal combustion engines in their importance and ubiquity. Electric propulsion systems can be implemented in a variety of applications including, for example, various vehicles. It is particularly envisioned that electric propulsion systems will be implemented with increasing frequency in aircraft. Although in some respects electric propulsion systems can be simpler to implement and operate by comparison with internal combustion engines, various operational considerations still need to be addressed in the design of electric propulsion systems.

Of particular significance in this regard are thermal management considerations relating to the operation of electric propulsion systems. Indeed, to achieve and maintain proper functioning of electrical propulsion systems, it is important that the electric motors and electric motor drives of those electric propulsion systems not experience overheating. The primary sources of heat within the stator electromagnetics of an electric motor typically are the resistive losses in the coils and the eddy current and hysteresis losses within the iron laminations, and these losses tend to increase with motor output. The primary heat sources within a motor drive are the power switches and to a lesser extent the gate drives and other electronics (which, when combined, contribute substantial additional heat). Among other things, it is particularly important that the semiconductor devices of electric motor drives not be overheated.

For at least one or more of these reasons, or one or more other reasons, it would be advantageous if new or improved thermal management systems for electrical propulsion systems, and/or new or improved electrical propulsion systems having such thermal management systems, and/or improved methods of operation or implementation involving such thermal management systems or electrical propulsion systems, could be developed, so as to address any one or more of the concerns discussed above or to address one or more other concerns or provide one or more benefits.

SUMMARY

The present disclosure is intended to encompass a variety of embodiments of electrical propulsion systems and related methods of operation and implementation. In at least one example embodiment, the present disclosure relates to an electric propulsion system comprising an electric motor, a motor drive coupled to the electric motor, and a thermal management subsystem. The electric motor is a permanent magnet synchronous motor, and the motor drive includes each of an inverter including a plurality of wide bandgap semiconductor field effect transistors (FETs), and a controller coupled at least indirectly to the FETs and configured to control the FETs by way of pulse width modulation (PWM) control. Additionally, at least a first portion of the electric motor and at least a second portion of the motor drive are cooled by the thermal management subsystem.

In at least one additional example embodiment, the present disclosure relates to a method of operating an electric propulsion system. The method includes providing the electric propulsion system and cooling at least one portion of the electric propulsion system by way of one or both of liquid convection and evaporative heat transfer. The electric propulsion system includes an electric motor, a motor drive, and a thermal management subsystem by which at least a first portion of the electric motor and at least a second portion of the motor drive are cooled. The electric motor is a permanent magnet synchronous motor, and the motor drive is coupled to the electric motor and includes each of an inverter including a plurality of wide bandgap semiconductor field effect transistors (FETs), and a controller coupled at least indirectly to the FETs and configured to control the FETs by way of pulse width modulation (PWM) control.

In at least one further example embodiment, the present disclosure relates to an electric propulsion system that includes an electric motor and a motor drive coupled to the electric motor. The electric motor has an annular motor housing including a plurality of first fins arranged along a first exterior surface of the annular motor housing, a plurality of motor components including a plurality of laminations, and a plurality of heat pipes extending substantially between the laminations and the annular motor housing at or proximate to the first fins. The motor drive has an annular motor drive housing including an internal chamber and a plurality of second fins arranged along a second exterior surface of the annular motor drive housing. Additionally, the motor drive also has a plurality of electronics components positioned within the internal chamber and including one or more control electronics components and one or more power electronics components. Further, the motor drive also has coolant positioned within the internal chamber so as to be in contact with the electronics components and with the annular motor drive housing at or proximate to the second fins. During operation of the electric propulsion system, first heat is transported by the heat pipes away from the laminations for receipt by the first fins, and second heat is communicated by the coolant away from the electronics components for receipt by the second fins, the first heat being carried away from the first fins and the second heat being carried away from the second fins due to air flow passing along the electric propulsion system.

Notwithstanding the above examples, the present invention is intended to encompass a variety of other embodiments including for example other embodiments as are described in further detail below as well as other embodiments that are within the scope of the claims set forth herein.

BRIEF DESCRIPTION OF THE DRAWINGS

Embodiments of the disclosure are disclosed with reference to the accompanying drawings and are for illustrative purposes only. The disclosure is not limited in its application to the details of assembly or arrangements of components, or orderings of process steps, illustrated in the drawings. The disclosure is capable of other embodiments or of being practiced or carried out in other various manners. In the drawings.

DETAILED DESCRIPTION

Figure 1:
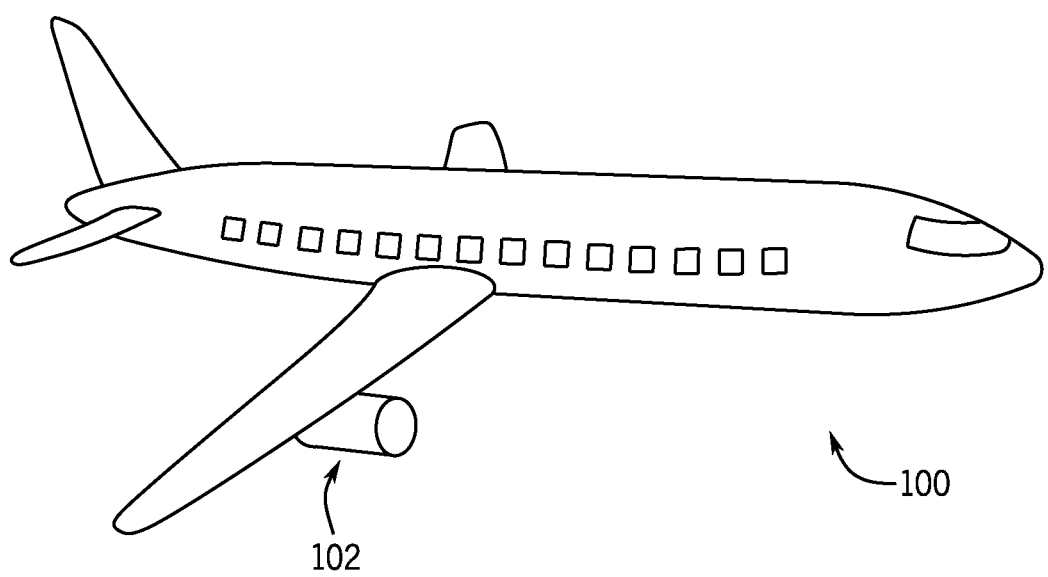
FIG. 1 is a right side perspective view of an aircraft having a first electric propulsion system in accordance with a first embodiment encompassed herein.

Referring to FIG. 1, a right side perspective view is provided of an aircraft 100 having a first electric propulsion system 102 in accordance with a first embodiment encompassed herein. The electric propulsion system 102 particularly is a propeller-type propulsion system having blades that spin relative to a remainder of the propulsion system and the aircraft 100 during operation so as to cause the aircraft and propulsion system to move forward through the air.

Although the aircraft 100 is shown to be a fixed-wing airplane, the present disclosure is intended to encompass of any of a variety of other types of aircraft that can employ electric propulsion systems including, for example, movable-wing aircraft such as vertical takeoff and landing aircraft (VTOL). Also, the present disclosure is intended to encompass any of a variety of types of vehicles or devices that can utilize electric propulsion systems including, for example, drones or airboats/fanboats.

Figure 2:
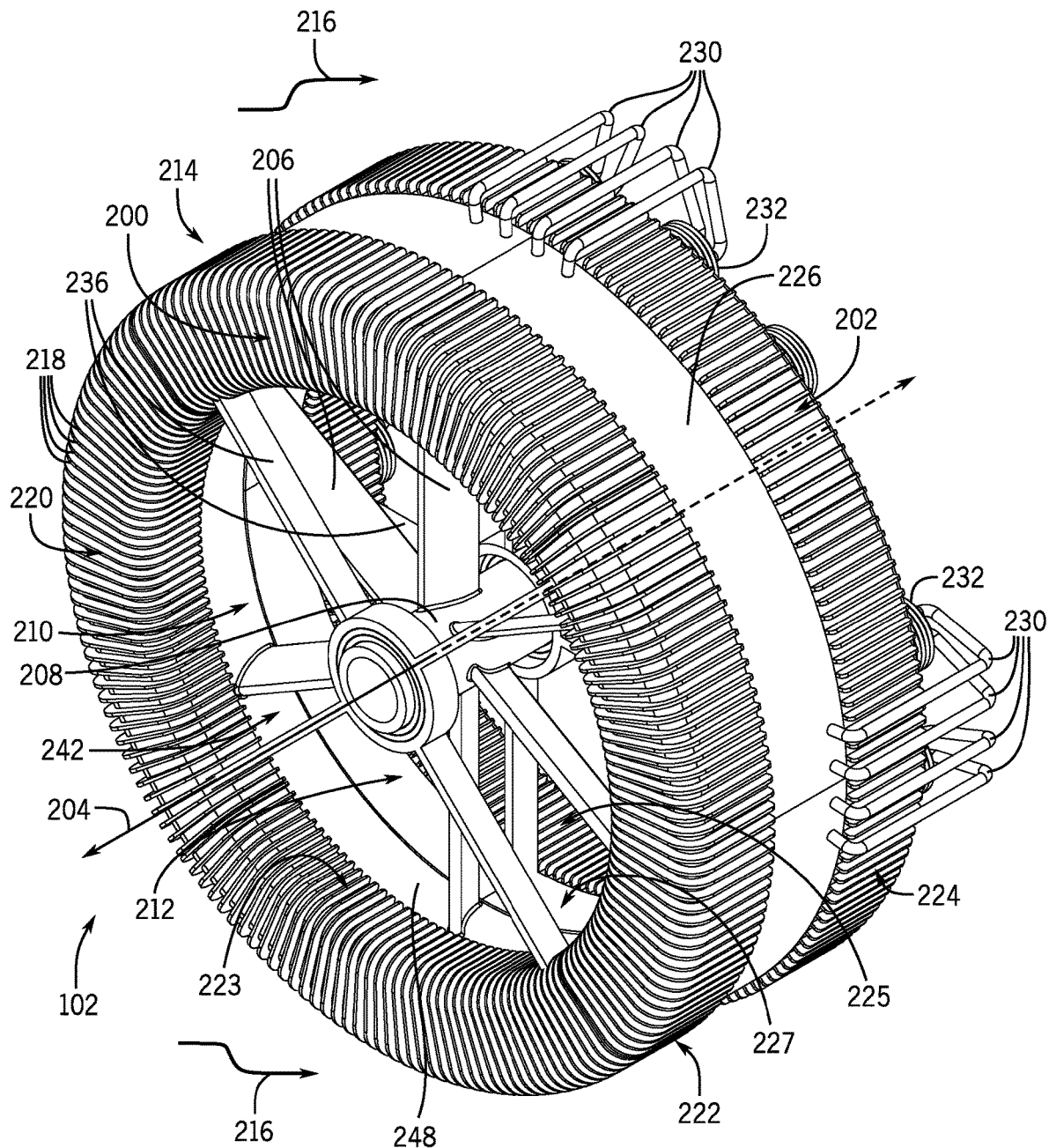
FIG. 2 is a front perspective view of the propulsion system of FIG. 1.
Figure 3:
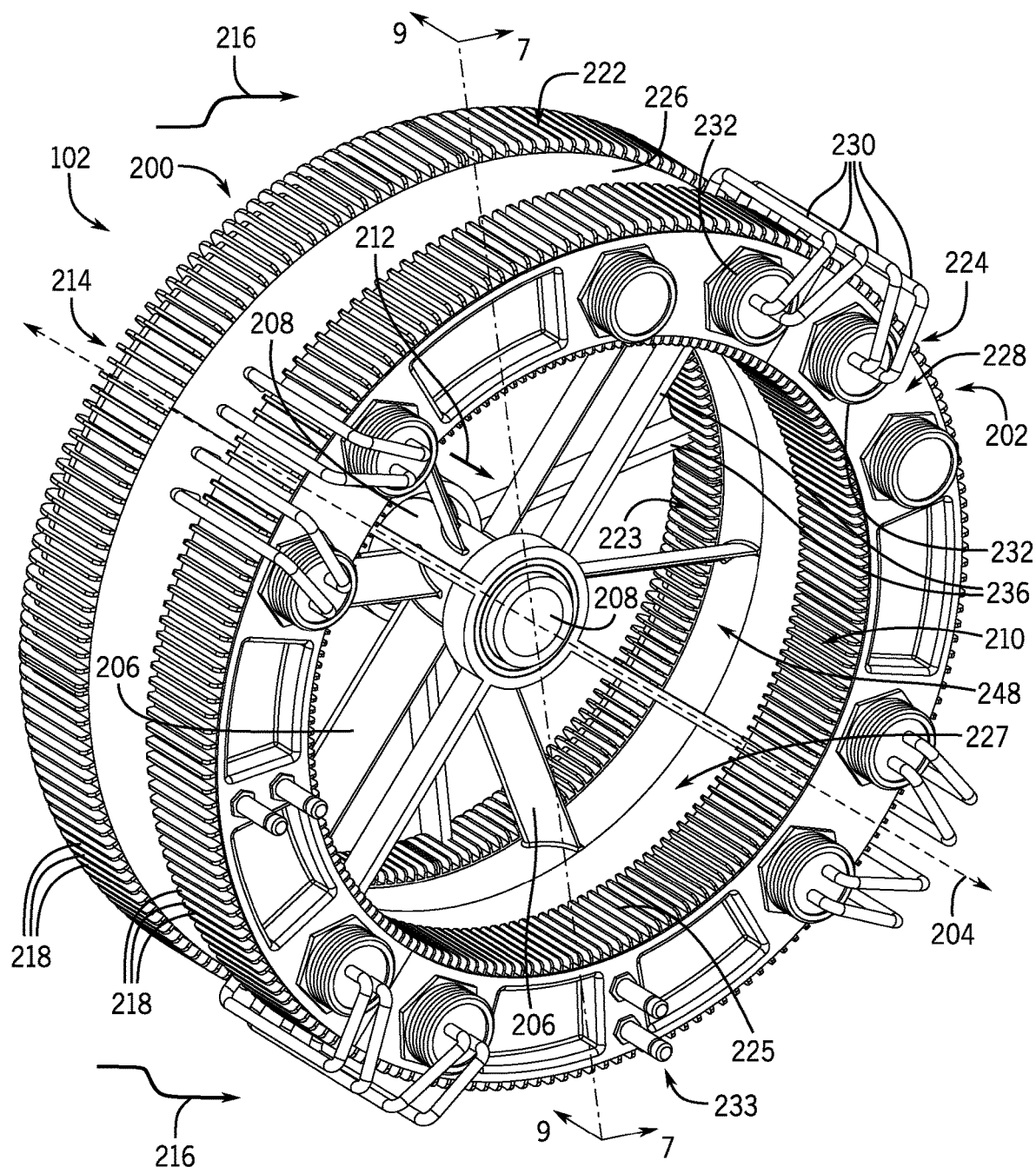
FIG. 3 is a rear perspective view of the propulsion system of FIGS. 1 and 2.
Figure 4:
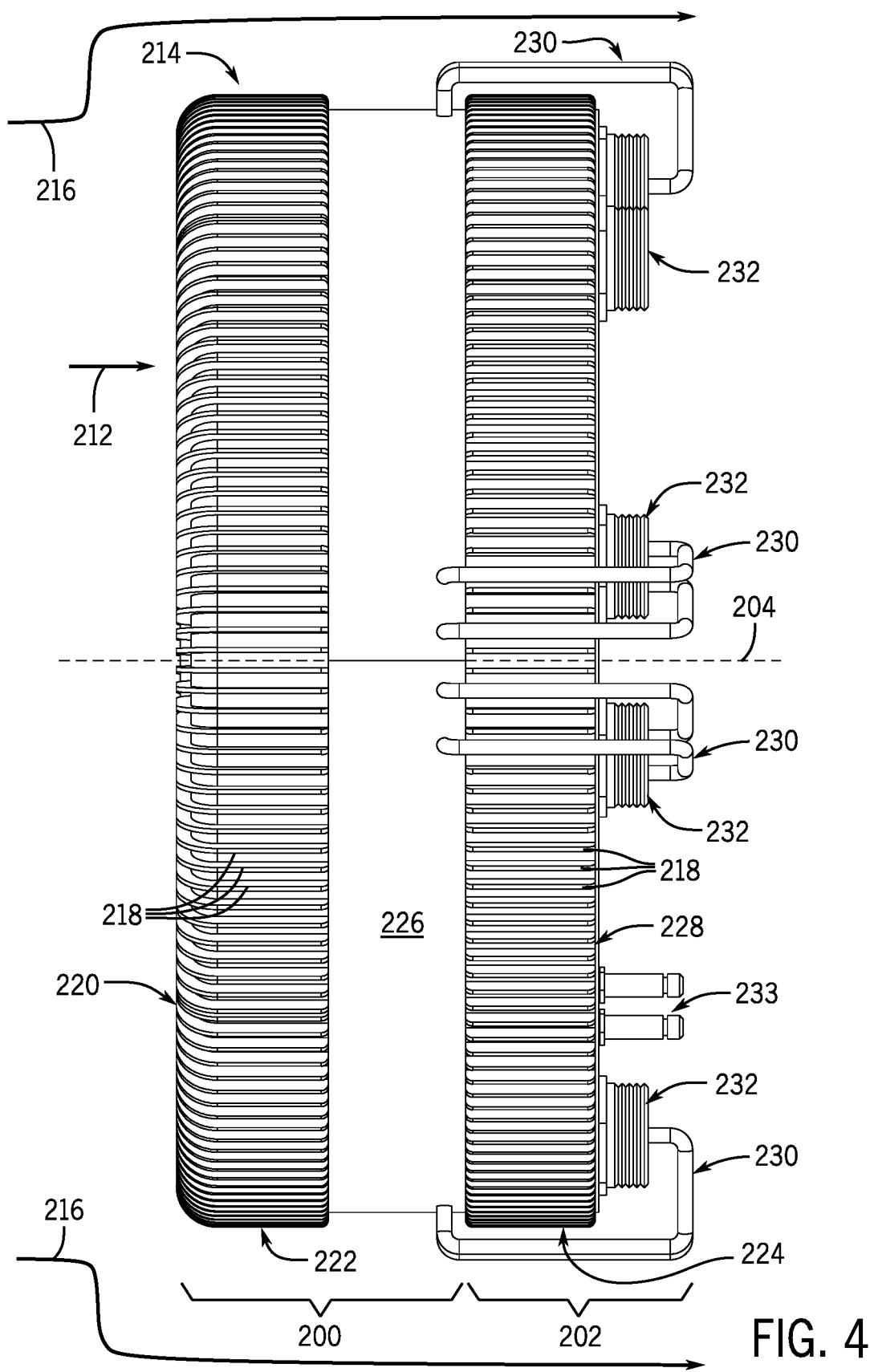
FIG. 4 is a left side elevation view of the propulsion system of FIGS. 1, 2, and 3.

Turning to FIG. 2, FIG. 3, and FIG. 4 respectively, front perspective, rear perspective, and left side elevation views of the first electric propulsion system 102 of FIG. 1 are respectively provided. As shown, the propulsion system 102 includes an electric motor 200 and an electric motor drive 202, each of which is substantially annular and coaxially-aligned along a central axis 204. As particularly shown in FIG. 2 and FIG. 3, the electric motor 200 in this embodiment also includes (or can be considered to include) a plurality of propeller (or fan) blades 206. The propeller blades 206 extend radially inwardly from an outer rim portion 248 (see FIG. 2 and FIG. 3) to an annular structural portion 208 of the electric motor 200 toward the central axis 204, within an inner flow passage 210 of the propulsion system 102 that extends through each of the electric motor 200 and the electric motor drive 202. The propeller blades 206, outer rim portion 248, and annular structural portion 208 can be integrally formed and constitute a fan 242.

It should be recognized that, during operation of the electric motor 200, the propeller blades 206 are caused to rotate about the central axis 204 such that, relatively speaking, air is drawn into the inner flow passage 210. In the present embodiment, air is drawn into the inner flow passage 210 in the direction indicated by an arrow 212. That is, in the present embodiment, air is drawn into the inner flow passage 210 so that it first passes through the electric motor 200 and subsequently passes through the electric motor drive 202. It should be additionally appreciated that, typically during operation when the propulsion system 102 is causing the aircraft 100 to move forward through the air, not only does air pass through the inner flow passage 210 in the manner indicated by the arrow 212, but also air passes/flows around outer surfaces 214 of the propulsion system 102 as indicated by arrows 216.

Further as shown in FIG. 2, FIG. 3, and FIG. 4, the electric motor 200 takes the form of a hub motor and more particularly includes, in addition to the fan 242, a front annular surface 220, a first outer cylindrical perimeter surface 222, a first inner cylindrical surface 223, a second outer cylindrical perimeter surface 226, and a second inner cylindrical surface 227. By comparison, the electric motor drive 202 includes a third outer cylindrical perimeter surface 224, and a third inner cylindrical surface 225 of the electric motor drive, as well as a rear annular surface 228. The second outer cylindrical perimeter surface 226 extends between the first and third outer cylindrical perimeter surfaces 222 and 224. The second inner cylindrical surface 227 is positioned between the fan 242 and the third inner cylindrical surface 225 of the electric motor drive 202, and the fan 242 is positioned between the second inner cylindrical surface 227 and the first inner cylindrical surface 223 of the electric motor 200.

Also as shown, the propulsion system 102 includes a plurality of fins 218 that extend along several of the surfaces discussed above. More particularly, the fins 218 extend along each of the front annular surface 220, the first outer cylindrical perimeter surface 222, and the first inner cylindrical surface 223 of the electric motor 200 as well as along each of the third outer cylindrical perimeter surface 224 and third inner cylindrical surface 225 of the electric motor drive 202. However, the fins 218 do not extend along the second outer cylindrical perimeter surface 226 or the second inner cylindrical surface 227 of the electric motor 200, or along the rear annular surface 228 of the electric motor drive 202—rather, the surfaces 226, 227, and 228 are generally (albeit not entirely, in the case of the surface 228) flat or smooth. Nor do the fins 218 extend along the outer rim portion 248 of the fan 242, which is positioned between the first inner cylindrical surface 223 and the third inner cylindrical surface 225.

Additionally visible in FIG. 2, FIG. 3, and FIG. 4 are motor drive control wires 230, which extend from the electric motor 200 to electric power connectors (hermetic) 232 arranged along the rear annular surface 228 of the electric motor drive 202. It will be appreciated that electric control signals generated by the electric motor drive 202 are communicated from the electric motor drive to the electric motor 200 and it is by way of those electric control signals that operation of the electric motor is governed by the electric motor drive. Fiber-optic controls input(s) (hermetic) 233 also are also shown to extend aftward from rear annular surface 228 of the electric motor drive 202.

Figure 5:
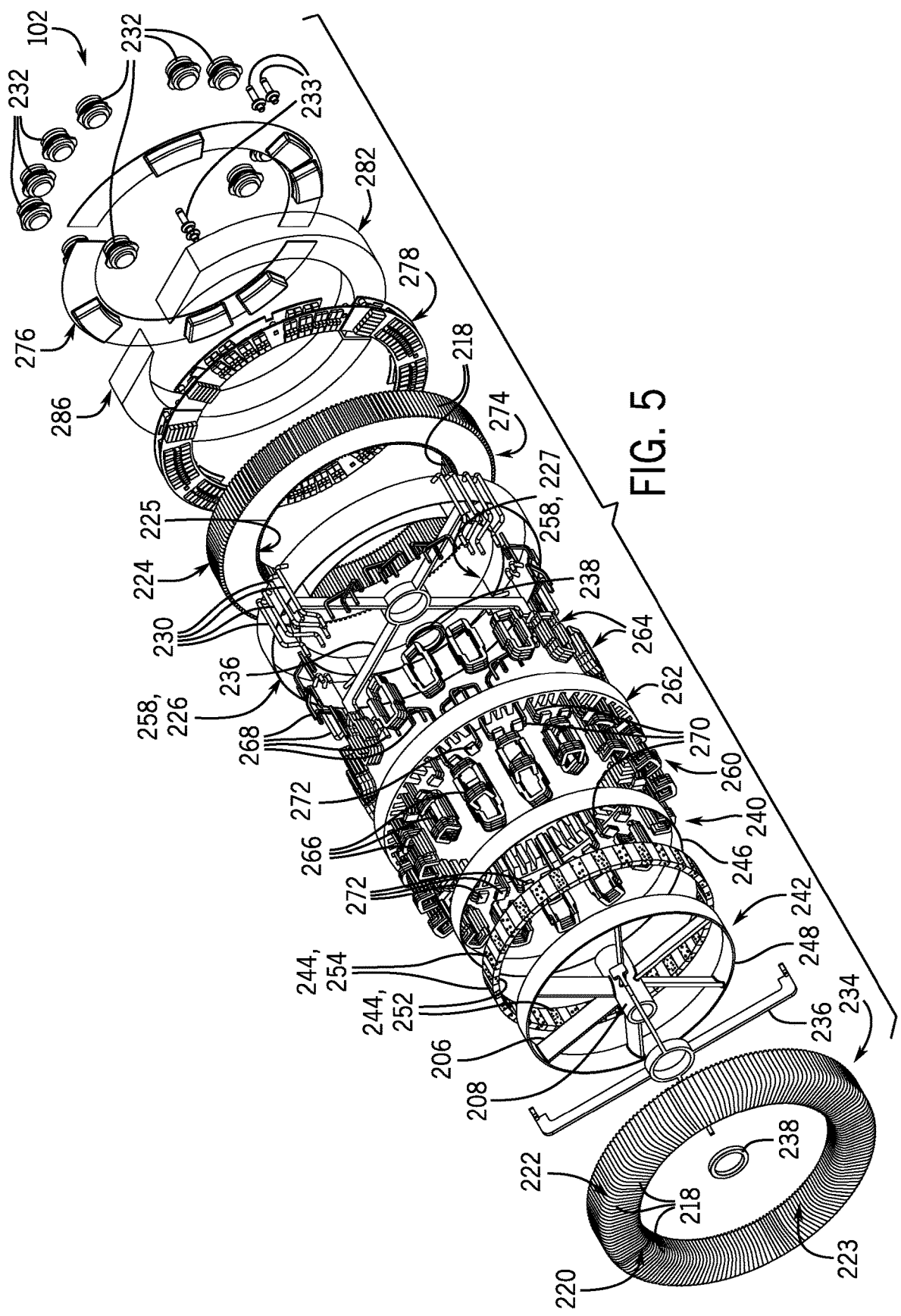
FIG. 5 is an exploded view of the propulsion system of FIGS. 1, 2, 3, and 4.
Figure 6:
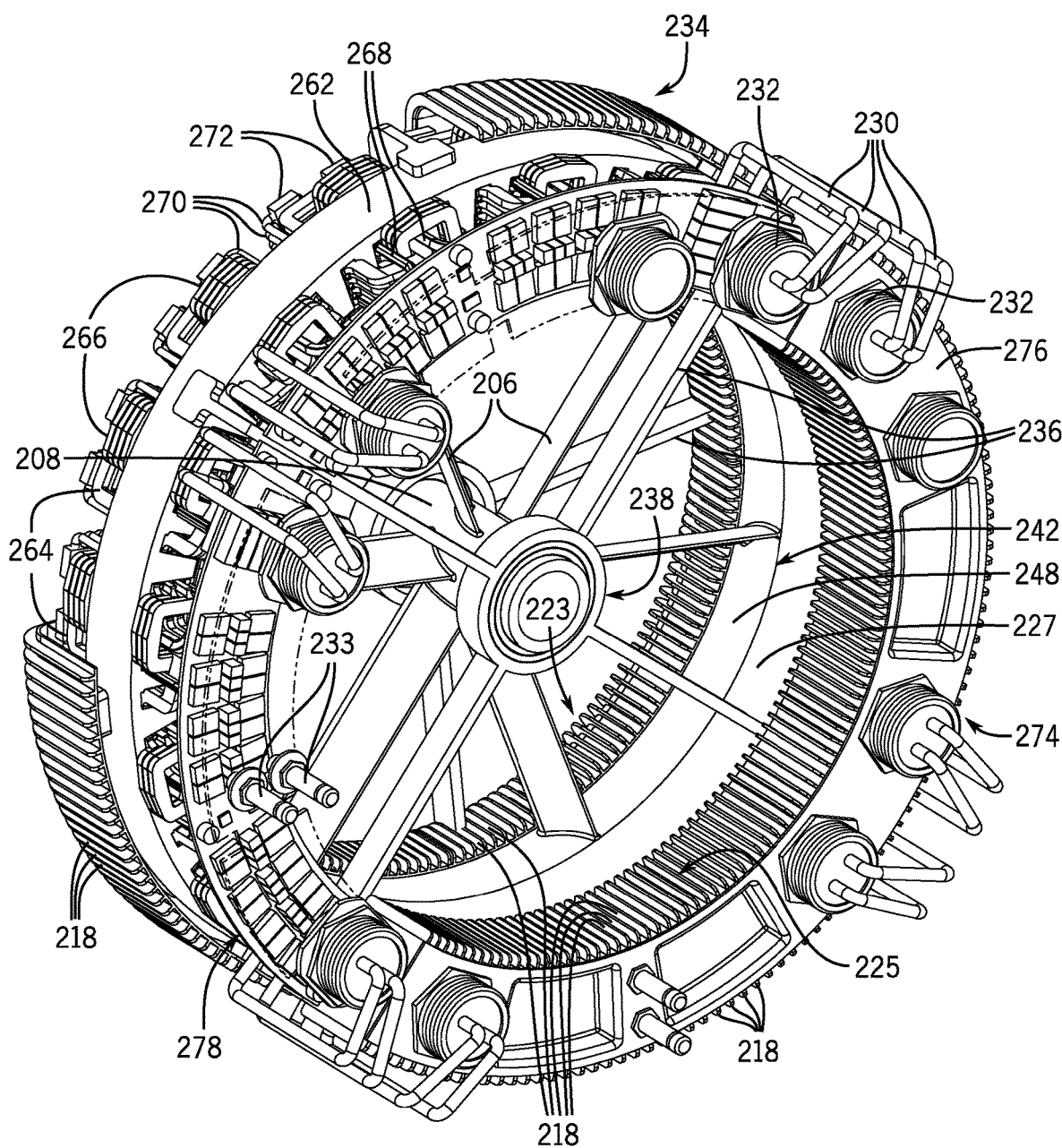
FIG. 6 is a rear perspective, partially-cutaway view of the propulsion system of FIGS. 1, 2, 3, 4, and 5.
Figure 7:
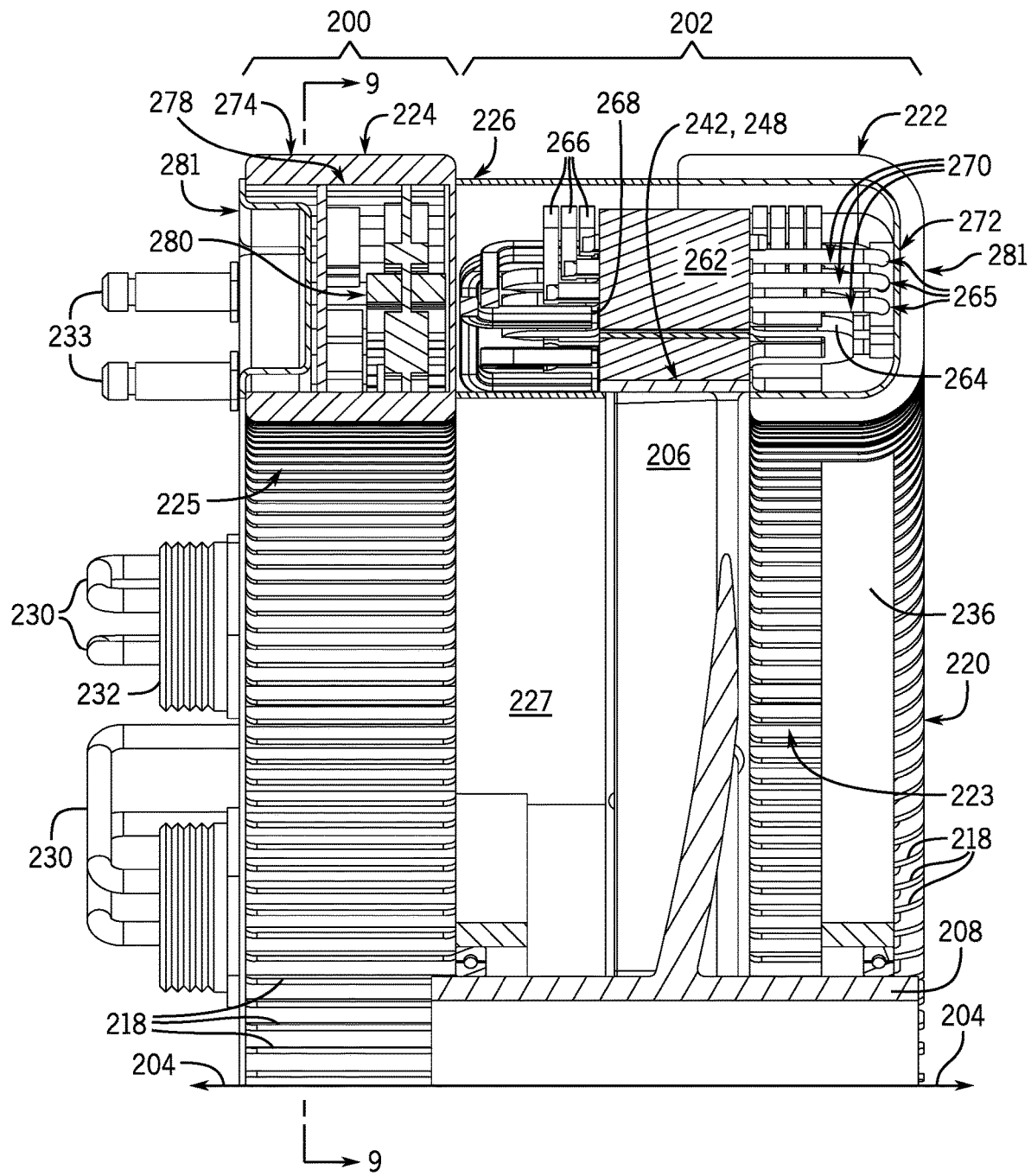
FIG. 7 is a cross-sectional, partial view of the propulsion system of FIGS. 1, 2, 3, 4, 5, and 6, taken along a line 7-7 of FIG. 3 and corresponding to a portion of the propulsion system below a horizontal plane defined by a central axis of the propulsion system shown in FIG. 3 (that is, the orientation of the view shown in FIG. 7 is rotated 180 degrees relative to the orientation of the propulsion system as shown in FIG. 3)

Referring additionally to FIG. 5, FIG. 6, and FIG. 7, three additional views are provided of the propulsion system 102 to further illustrate components of that system. FIG. 5 particularly shows an additional exploded view of the propulsion system 102. By comparison, FIG. 6 shows a rear perspective, partially-cutaway view of the propulsion system 102 in which external housing portions of the electric motor 200 and electric motor drive 202 are removed so as to reveal internal components of the electric motor and electric motor drive. Additionally, FIG. 7 is a cross-sectional, partial view of the propulsion system 102 taken along a line 7-7 of FIG. 3 and corresponding to a portion of the propulsion system 102 that is below a horizontal plane defined by the central axis 204 as shown in FIG. 3 (that is, the orientation of the view shown in FIG. 7 is rotated 180 degrees relative to the orientation of the propulsion system as shown in FIG. 3);

As shown, the electric motor 200 of the propulsion system 102 includes an annular motor heat sink 234 on which are formed the front annular surface 220, the first outer cylindrical perimeter surface 222, and the first inner cylindrical surface 223 on which are formed several of the fins 218. Additionally, the electric motor 200 includes a pair of braces 236 and a pair of bearings 238.

Further, the electric motor 200 includes a rotor 240. The rotor 240 can be understood as including each of the fan 242 (which again includes the propeller blades 206, annular structural portion 208, and outer rim portion 248), a plurality of rotor magnets 244, and a composite retaining sleeve 246. It will be appreciated that, when the propulsion system 102 is fully assembled, the rotor magnets 244 are positioned radially outward of the outer rim portion 248 and radially inward of the composite retaining sleeve 246. The composite retaining sleeve 246 particularly holds the rotor magnets 244 in place so that the rotor magnets do not disengage from the rotor 240 due to centrifugal forces during operation of the propulsion system 102. In the present example embodiment, the electric motor 200 is a two-phase electric motor (although in alternate embodiments encompassed herein the electric motor can have a different number of phases or take other forms). Additionally, the rotor magnets 244 include first magnets 252 and second magnets 254. The first magnets 252 are polarized such that magnetic flux originating from those first magnets extends radially outward. The second magnets 254 are polarized opposite to the first magnets 252, such that magnetic flux originating from the second magnets 254 extends radially inward. When the propulsion system 102 is fully assembled, the first magnets 252 and second magnets 254 are alternatingly positioned circumferentially about the annular rim 248, radially in between the annular outer rim portion 248 and the composite retaining sleeve 246.

In addition, the electric motor 200 of the propulsion system 102 also includes a stator 260. The stator 260 includes stator laminations 262 (shown to take an annular shape overall). Also, given that the electric motor 200 in the present embodiment is a two-phase electric motor as mentioned above, the electric motor further includes first phase motor coils 264 and second phase motor coils 266. Additionally, the electric motor 200 also includes winding interconnects 268, heat pipes 270, and thermally conductive elements 272. Further, the electric motor 200 includes a motor housing (or housing portions) 258 having outer and inner annular portions respectively forming the second outer cylindrical perimeter surface 226 and second inner cylindrical surface 227, respectively. When the electric motor 200 is fully assembled, the above-described components of the rotor 240 and the stator 260 are contained within the combination of the motor housing 258 and the annular motor heat sink 234, which together constitute the overall housing of the electric motor 200.

Further as shown, the propulsion system 102 also includes the electric motor drive 202. The electric motor drive 202 has a motor drive housing 274 that includes the third outer cylindrical perimeter surface 224 and third inner cylindrical surface 225, as well as a wall cover 276 that includes the rear annular surface 228. Additionally, the electric motor drive 202 further includes an annular electric circuit board assembly 278 on which are mounted various electrical circuit components of the motor drive, including power semiconductor devices. Further, the electric motor drive 202 includes the motor leads 230, the electric power connectors 232, and the fiber-optic controls input(s) 233 already discussed above.

It should be appreciated that, when the propulsion system 102 is fully assembled, the annular electric circuit board assembly 278 is supported within the motor drive housing 274 and positioned axially between the electric motor 200 and the wall cover 276. The motor leads (wires) 230 are electrically coupled to components of the annular electric circuit board assembly 278 by way of the electric power connectors 232 mounted on the wall cover 276. Further, the motor leads 230 are coupled to the first phase motor coils 264 and second phase motor coils 266 of the stator 260 by way of the winding interconnects 268. The winding interconnects 268 particularly serve to electrically couple respective sets of the motor coils 264 and 266 to respective ones of the motor leads 230 (e.g., by series or alternatively parallel coupling).

During operation of propulsion system 102, electric control signals for controlling the electric motor 200 are generated by the components on the annular electric circuit board assembly 278 and communicated to the first phase motor coils 264 and second phase motor coils 266 of the stator 260 by way of the electric power connectors 232, the motor leads 230, and the winding interconnects 268. By virtue of those electric control signals, the electric motor drive 202 particularly controls the currents flowing within the first phase motor coils 264 and second phase motor coils 266 of the stator 260 and the generation of magnetic fields by the stator that interact with the rotor magnets 244 of the rotor 240, and thereby governs operation (e.g., rotational velocity and torque) of the electric motor 200.

In the present embodiment, the propulsion system 102 is an air cooled system. During operation, air flows through and around the propulsion system 102 as indicated by the arrows 212 and 216, respectively, and portions of that air flows along and proximate to the fins 218 and thereby serves to cool (remove heat from) the fins 218. Such cooling of the fins 218 enables overall cooling of the electric motor drive 202 and the electric motor 200.

The cooling process within the propulsion system 102 is achieved, when there is air flow through and around the propulsion system 102, by way of a thermal management subsystem (or system) 281 of the propulsion system. In the present embodiment, the thermal management subsystem includes portions that respectively constitute parts of, and serve to perform cooling with respect to, each of the electric motor 200 and the electric motor drive 202, respectively. Although the thermal management subsystem 281 is indicated as being generally present in FIG. 7, it should be appreciated that the thermal management subsystem for the propulsion system 102 includes a variety of different components and features. The respective portions of the thermal management subsystem 281 that serve to cool the electric motor 200 and electric motor drive 202 respectively entail a number of different components and features and are described in further detail below.

More particularly, a first portion of the thermal management subsystem (which is part of the electric motor 200) 281 achieves cooling of the electric motor by way of the heat pipes 270 and conductive elements 272 (and is not immersion cooled). That is, heat from the electric motor 200 is conducted away from the electric motor 200 via the heat pipes 270 and thermally conductive elements 272 and, due to the air cooling of the fins 218, is removed by the air flowing around the fins. FIG. 7 particularly shows how the heat pipes 270 extend forward from the stator laminations 262 to the fins 218 along the front annular surface 220 that serves as a heat sink cover, such that cold side portions 265 of the heat pipes are connected by way of the thermally conductive elements 272 to the heat sink cover and the fins thereof. Given this arrangement, it should be appreciated that the first portion of the thermal management subsystem 281 that is part of the electric motor can be considered to include the heat pipes 270, including the cold side portions 265 thereof, and the thermally conductive elements 272, as well as the heat sink (or heat sink cover) 234 and the fins 218 at which air cooling takes place (e.g., the fins 218 along the front annular surface 220).

Further with respect to the process of cooling the electric motor 200 (the motor cooling approach), the primary sources of heat within the electric motor are associated with the stator electromagnetics, particularly the resistive losses in the coils (e.g., within the first phase motor coils 264 and second phase motor coils 266) and the eddy current and hysteresis losses within the iron laminations (e.g., within the stator laminations 262). These losses increase with motor output power. Thus, when the propulsion system 102 is implemented in an aircraft such as the aircraft 100, take-off and initial climb are the critical flight phases in terms of when maximum (or full or peak) motor output power and associated maximum heat dissipation is experienced. Although the thermal inertia of the electric motor 200 can help mitigate the thermal challenge of limited duration peak power, the thermal management goal generally is to allow full power continuously. The temperature requirements of the coils (e.g., the first phase motor coils 264 and second phase motor coils 266) and iron laminations (e.g., the stator laminations 262) can be defined by the insulation system(s) used. In the present embodiment, the target maximum operating temperature is below 200° C.

Further with respect to the heat pipes 270 employed for cooling of the electric motor 200, heat pipe material selection can be of significance. Although copper water heat pipes can be employed in relation to aluminum coils (e.g., the first phase motor coils 264 and second phase motor coils 266) as a heat pipe material combination, it should be appreciated that copper heat pipes and aluminum coils in intimate contact in a wet environment can corrode. Given this consideration, in one embodiment encompassed herein, the electric motor 200 can include an electrical insulation system that provides a corrosion barrier that allows copper to be used for the heat pipe in contact with aluminum.

In an alternate embodiment also encompassed herein, a different heat pipe material such as aluminum can be used with a change of working fluid to pentane, methanol or methylamine (e.g., instead of water, although water can also be used in heat pipes). In general, an appropriate arrangement can be achieved by determining an extent of the corrosion potential after an electrical insulation system is chosen, and exploring existing alternate pipe and working fluid combinations compatible with the aluminum alloy used for the electric coils (e.g., the first phase motor coils 264 and second phase motor coils 266). Ultimately, the electric motor 200 including the heat pipes 270 desirably will be lightweight and low cost, and also will entail high performance heat pipe materially compatible with the electric coil and cover materials used.

Figure 8:
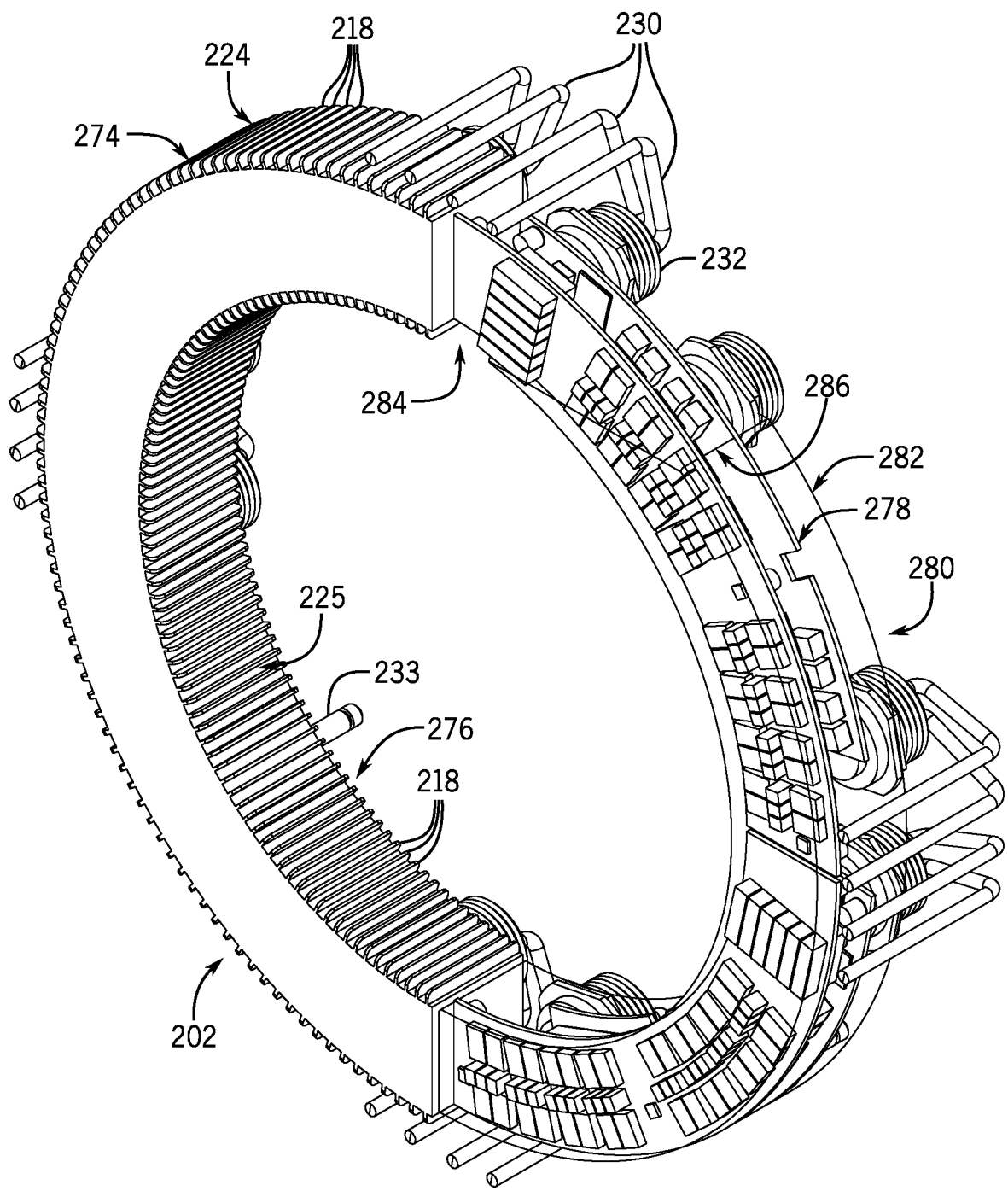
FIG. 8 is a front perspective, partially-cutaway view of an electric motor drive of the propulsion system of FIGS. 1, 2, 3, 4, 5, 6, and 7.
Figure 9:
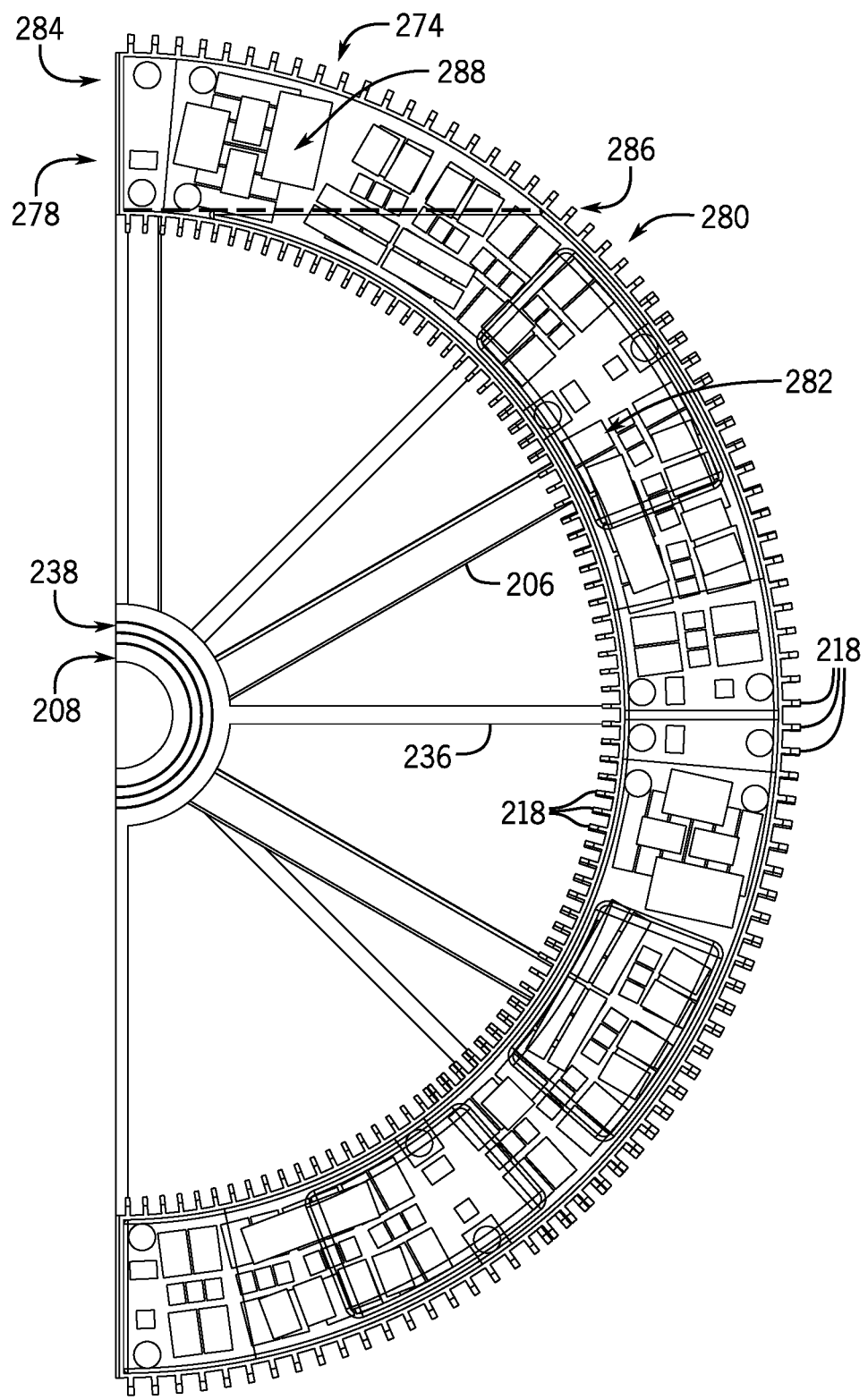
FIG. 9 is a rear elevation, cross-sectional, partial view of the propulsion system of FIGS. 1, 2, 3, 4, 5, 6, 7, and 8, taken along a line 9-9 of FIG. 3 and showing a cross-sectional view of a half portion of the propulsion system that is the same half portion which is the subject of FIG. 7.

As for the cooling of the electric motor drive 202, the second portion of the thermal management subsystem (which is part of that motor drive) 281 achieves cooling of that motor drive through two-phase immersion cooling of the annular electric circuit board assembly 278. Cooling is achieved particularly by way of cooling fluid within the motor drive housing 274, which is cooled by action of the air cooling of the fins 218. To facilitate an understanding of this second portion of the thermal management subsystem 281 and the immersion cooling of the electric motor drive 202, further views are provided of portions of the propulsion system in FIG. 8 and FIG. 9. FIG. 8 is a front perspective, partially-cutaway view of the electric motor drive 202 of the propulsion system 102 (that is, the electric motor drive 202 but not the electric motor 200). FIG. 9 is a rear elevation, cross-sectional, partial view of the propulsion system 102, taken along a line 9-9 of FIG. 3 and showing a cross-sectional view of a half portion of the propulsion system that is the same half portion which is the subject of FIG. 7.

More particularly, with respect to the process of cooling the electric motor drive 202 (the motor drive cooling approach or motor drive inverter cooling approach), the motor drive electronics (particularly the electrical components of the annular electric circuit board assembly 278) in the present embodiment are cooled using two phase immersion cooling. The motor drive electronics (e.g., the electrical components of the annular electric circuit board assembly 278) are housed in two inverter units 280 of the annular electric circuit board assembly, which are located within an internal chamber 284 of the motor drive 202, aft of the motor 200. Each of the two inverter units 280 is arc-shaped (or semicircularly-shaped), and the motor drive control wires (or leads) 230 plug into the inverter units 280 of the motor drive (or drives) 202. The inverter units 280 are thus connected to the motor terminals through the motor drive control wires (or leads) 230 (which are short wires).

FIG. 9 particularly shows a first one of the two inverter units 280, and it should be appreciated that the other one of the inverters is a mirror image of the first one shown in FIG. 9. Each of the inverter units 280 includes one or more control electronics components and one or more power electronics components. For example, the power electronics components can include a plurality of wide bandgap semiconductor field effect transistors (FETs). Also for example, the one or more control electronics components can include a controller that is coupled at least indirectly to the FETs and configured to control the FETs by way of pulse width modulation (PWM) control (e.g., PWM control signals). The control electronics components can be, but need not be, at vertically-lower position(s) within the electric motor drive 202 than the power electronics components.

FIG. 8 and FIG. 9, as well as FIG. 5, also illustrate liquid coolant 282 that is present within the internal chamber 284 of the motor drive 202 and is employed for achieving immersion cooling of the motor drive electronics. As shown in FIG. 8, FIG. 9, and FIG. 5, although the liquid coolant 282 occupies most of the internal chamber 284, the liquid coolant does not entirely fill the internal chamber but rather occupies the internal chamber up to a level 286. Above the level 286 is a region 288 within which vapor/gas can instead be present. It will be appreciated that, depending upon the heat level within the motor drive 202, portions of the liquid coolant 282 can evaporate/vaporize. Likewise, depending upon the heat level, portions of the liquid coolant 282 that have previously evaporated/vaporized can condense/liquify. Correspondingly, although not illustrated in FIG. 8, FIG. 9, and FIG. 5, bubbles can form (due to boiling of the liquid coolant 282) at locations below the level 286, and can rise vertically upward (bottom to top) to the region 288. As the bubbles move upward, or at least upon reaching the region 288, the bubbles ultimately can condense. Indeed, more generally, portions of the vapor/gas within the region 288 (e.g., above the level 286) or otherwise present within the motor drive can condense.

Thus, as heating and cooling occurs, a natural circulation path exists within the enclosure of the motor drive 202 (e.g., the motor drive housing 274 and wall cover 276), and the circulation is achieved without any pump. As heating occurs, the liquid coolant 282 is heated, and experiences convection movement upwards. Additionally, as heating continues, the liquid coolant 282 eventually transforms into vapor/gaseous form (as the bubbles) and proceeds upward to the region 288 above the level 286. It should be noted that the liquid coolant 282 boils at higher temperature(s) due to pressure within the enclosure of the motor drive 202, which serves as a tire-shaped pressure vessel (and correspondingly more heat is taken away). Further, as cooling occurs with respect to the liquid coolant 282 and particularly that portion of the liquid coolant 282 that is no longer in liquid form but rather is vapor/gas within the region 288, the vapor/gas condenses and returns back downward below the level 286. Likewise, the cooling fluid can experience convection movement downwards. Upon returning to liquid form below the level 286, heating again can occur the cycle can be repeated.

Given the above description, it will be appreciated that heat generated by the motor drive electronics of the electric motor drive 202 during operation of the propulsion system 102 can be dissipated as follows. First, the liquid coolant 282 receives/is exposed to heat from the motor drive electronics and experiences liquid convection as the liquid coolant is heated. Second, a portion of the liquid coolant experiences evaporative heat transfer and evaporates to take on the gaseous form (e.g., bubbles are generated and rise above the level 286). Third, heat is conducted away from the liquid coolant 282, and/or away from the portion of that coolant that has taken on the gaseous form above the level 286, through the enclosure of the motor drive 202 (e.g., the motor drive housing 274 and wall cover 276) and particularly to the fins 218 arranged along the exterior surface of that enclosure. Fourth, heat is then carried away from the fins 218 due to the fins being exposed to air flow. Correspondingly, the portion of the coolant that took on gaseous form condenses and the liquid coolant 282 experiences convection movement downward away from the level 286.

It should be appreciated that, depending upon operational circumstances, the level 286 can vary depending upon the heat level within the motor drive 202. For example, if the heat level increases sufficiently, the level 286 can move downward as a greater proportion of the liquid coolant 282 vaporizes and, if the heat level decreases sufficiently, the level 286 can move upward as a greater proportion of the liquid coolant condenses/liquifies. Further, notwithstanding the illustration of the liquid coolant 282 as extending up to the level 286, it should be appreciated that the actual orientation (e.g., rotational orientation) of the level 286 is determined by gravity acting upon the liquid coolant and can vary depending upon positioning of the propulsion system 102 as a whole. For example, if the entire propulsion system 102 is rotated about the central axis 204, then the position/rotational orientation of the level 286 (and corresponding positioning of the liquid coolant 282 and internal chamber 284 below and above that level, respectively), can vary from the position/rotational orientation of the level 286 shown in FIG. 8, FIG. 9, and FIG. 5.

Immersion cooling is a known, established technique for cooling components within Cray supercomputers and for computer server cooling. In the present embodiment, immersion cooling is employed to dissipate or remove heat from the various heat sources of the electric motor drive 202 (again, e.g., the power switches, gate drives, and other electronics of the inverter units 280/annular electric circuit board assembly 278). By virtue of the immersion cooling made possible by way of the liquid coolant 282, heat is conducted from those heat sources to the outside surfaces or enclosure of the motor drive 202, and particularly to the motor drive housing 274 and fins 218 thereof, by two phase evaporation at the source and condensation at the enclosure. Natural convection driven by temperature-caused density differences and by drag from vapor bubbles rising from local hot spots occurs in addition to the two-phase cooling.

More particularly, the motor drive 202 has several structural features that facilitate heat dissipation, and that can be considered components or features of the second portion of the thermal management subsystem 281 of the propulsion system 102 that serves to cool that motor drive. In particular, as already described, the motor drive housing 274 includes/incorporates the fins 218, particularly along the third outer cylindrical perimeter surface 224 and the third inner cylindrical surface 225. The fins 218 on the motor drive housing 274 generally extend linearly in a front-to-rear direction along the propulsion system 102, generally parallel to the air stream that will flow around and through the propulsion system 102 during operation, as represented by the arrows 216 and 212 (e.g., as shown in FIGS. 2, 3, and 4). Arrangement of the fins 218 in this manner, generally parallel to the air stream, serves to enhance the forced convection heat transfer during operation.

Additionally, in the present embodiment, inwardly-directed fins are also added to an inside of the cover (e.g., the cover 276) to provide additional condensation and conduction area. Further, in at least some embodiments electronic device surface enhancements may be added to enhance vapor bubble formation. Thermal spreading of the heat from the case is typically not required with immersion cooling since the liquid critical heat flux is greater than the maximum case heat flux. Device case temperatures of the high thermal dissipation components can be determined by the ability to form vapor bubbles at the local fluid pressure and the resulting vapor pressure.

The internal chamber 284 of the motor drive 202 in which the liquid coolant 282 is present, as well as the liquid coolant itself, can also be considered to constitute components or features of the second portion of the thermal management subsystem 281 of the propulsion system 102 that serves to cool the electric motor drive 202. Depending upon the embodiment, any of a variety of different fluids can serve as the liquid coolant 282 and that the liquid coolant can be introduced into the motor drive enclosure (the motor drive housing 274 and cover 276) in various manners. In the present embodiment, the liquid coolant 282 used within the motor drive enclosure can take the form of a dielectric heat transfer fluid. Appropriate candidates for the liquid coolant 282 in this regard include FC-40, FC-72, Novec 7300 and Novec 7500 available from the 3M Company of Maplewood, Minn. These fluids have been proven in many electrical cooling applications and have properties suited for this use, e.g., within the motor drive 202. More particularly, these properties of these fluids include low surface tension and viscosity for good device wettability, low to moderate latent heat of evaporation to enhance the mass of vapor formation, good thermal conductivity, high dielectric strength, non-flammable, low pour point temperature and a vapor pressure suited for the anticipated temperature application.

Ultimately, it is desirable to achieve, in regard to the motor drive enclosure (e.g., motor drive housing 274 and cover 276), leak-free fixed and removable joints of the selected enclosure materials and a configuration that can withstand repeated temperature and pressure cycles, both internal and external. However, because the appropriate candidates for the liquid coolant 282 (or immersion cooling fluid) typically are, by their required nature, low viscosity, low surface tension liquids, the liquid coolant 282 can be difficult to implement within the motor drive 202 in a manner that is sealed against leaks. In order to overcome this challenge, any one or more of several different sealing techniques can be used (and tested) in various locations in the motor drive enclosure, including solder joining, adhesive joining, bolted joints with gaskets and/or O-rings. The testing of various sealing techniques can include temperature/pressure cycling to increase confidence in long life.

Figure 10:
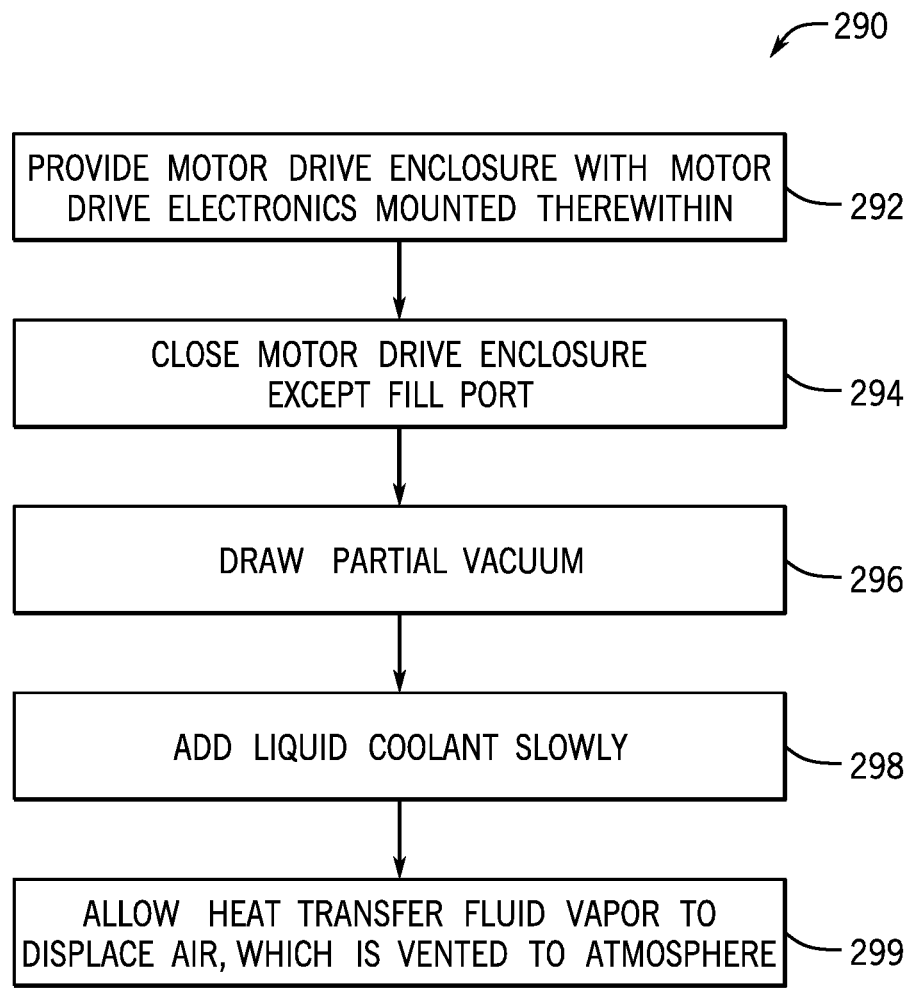
FIG. 10 is a flow chart showing steps of an example process for filling, with coolant, a motor drive enclosure of an electric motor drive of the propulsion system of FIGS. 1 through 9.

Further, in the present example embodiment, the process for filling the motor drive enclosure (again, e.g., the motor drive housing 274 and cover 276) with the liquid coolant 282 and sealing the motor drive enclosure can be performed in accordance with a flow chart 290 shown in FIG. 10, as follows. The process begins at a first step 292, at which the motor drive enclosure (again, e.g., the motor drive housing 274 and cover 276) is provided, with the motor drive electronics (e.g., the electrical components of the inverters 280/annular electric circuit board assembly 278) mounted therewithin and electrical connections are made. It should be appreciated that, overall, the motor drive enclosure will have a minimum number of sealing joints so as to minimize the chance of leaks.

After the motor drive electronics (e.g., the electronics associated with the inverters 280/annular electric circuit board assembly 278) are mounted within the motor drive enclosure and electrical connections are made, at a second step 294 the motor drive enclosure is closed except for a fill port (not shown). Next, at a third step 296, a partial vacuum is then drawn to remove some of the air. Further, at a fourth step 298, the liquid coolant 282/immersion cooling fluid is added (slowly, to minimize air entrainment). Finally, at a fifth step 299, the partially-filled motor drive enclosure then is allowed to settle while vented to atmosphere and the heat transfer fluid vapor, which is heavier than air, displaces remaining air to minimize non-condensables within the enclosure.

Figure 11:
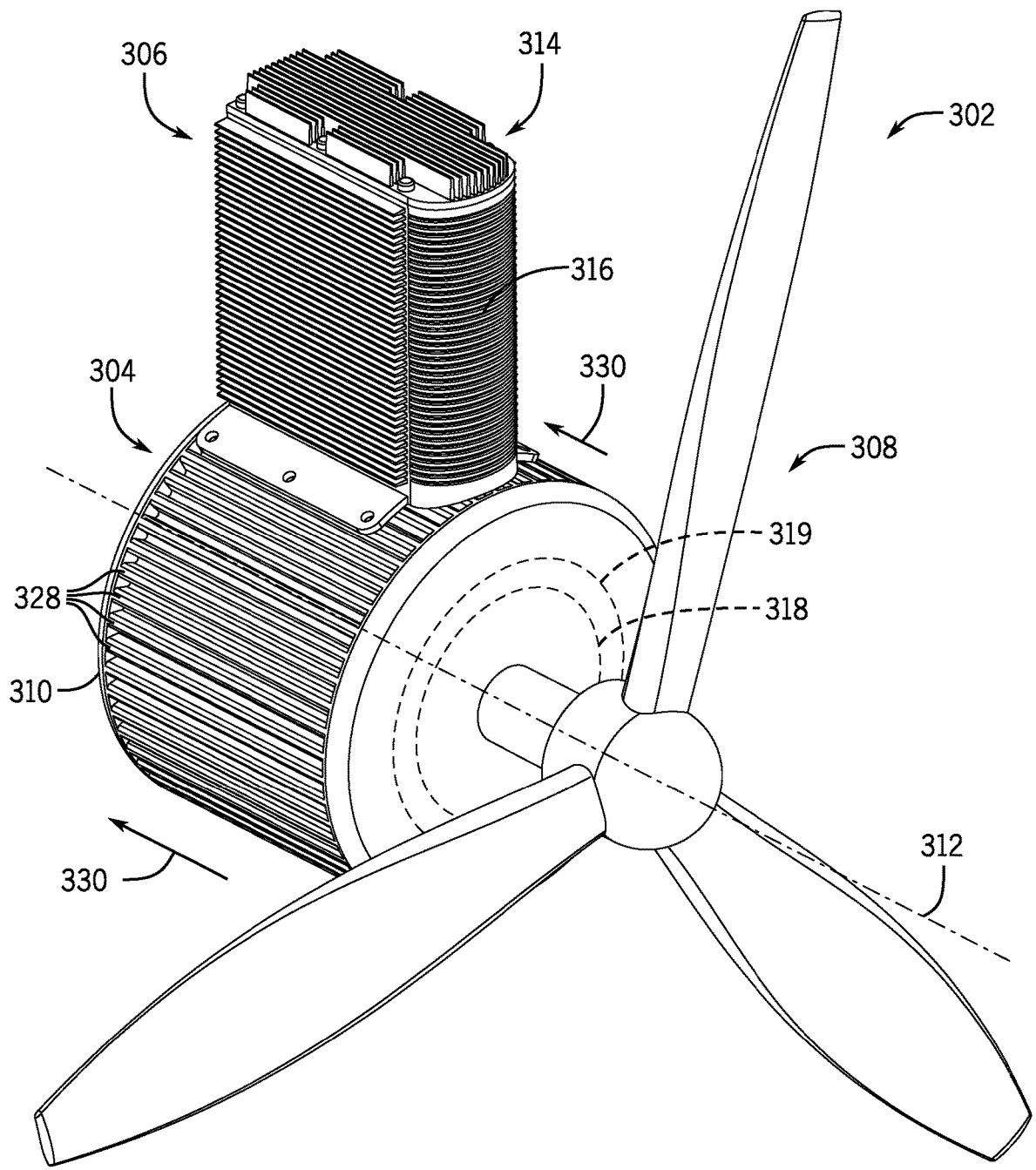
FIG. 11 is a front perspective view of a second electric propulsion system in accordance with a second, alternative embodiment differing from the first electric propulsion system of FIGS. 1 through 10.

Notwithstanding the above description relating to FIGS. 1 through 10 concerning the propulsion system 102, the present disclosure is intended to encompass numerous alternate embodiments of propulsion systems as well. One example of such an alternate embodiment of a propulsion system is shown in FIG. 11 as a propulsion system (or powertrain concept) 302. The propulsion system 302 can be considered to include a tightly integrated and co-packaged electric motor (or electric propulsion motor) 304, electric motor drive 306, and associated thermal management subsystem (or system), which can be considered to form parts of and to be integrated with the electric motor and electric motor drive. Also, the propulsion system 302 includes a propeller 308 that is supported upon and driven by (and also can be considered to be part of) the electric motor 304.

It will be appreciated from a comparison of the propulsion system 302 relative to the propulsion system 102 that, in this example alternate embodiment, the propeller 308 is positioned externally and in front of the electric motor 304 (rather than within the electric motor), which supports that propeller. As shown, the electric motor 304 includes a cylindrical (or substantially cylindrical) motor housing 310 that extends substantially about a propeller axis 312 about which the propeller 308 is configured to rotate. Also, as shown in FIG. 11, the electric motor drive 306 of the propulsion system 302 is located vertically above/on top of the electric motor 304 rather than being positioned coaxially with and aftward of the motor as described above in regard to the propulsion system 102. As shown, the electric motor drive 306 is housed within a box-shaped motor drive housing (or tower) 314 having a curved front surface 316. Internal components of the electric motor drive 306 are shown and described in further detail with reference to FIG. 12. Although not shown in relation to an aircraft such as the aircraft 100 of FIG. 1, the propulsion system 302 also can be mounted in relation to such an aircraft (or other types of aircraft, vehicles, or devices).

In the propulsion system 302, the electric motor 304 is a permanent magnet synchronous motor that is selected for its inherent high efficiency. Although the internal components of the electric motor 304 are not shown in detail, it should be appreciated that the electric motor includes a rotor 318 and a stator 319, which are illustrated figuratively in phantom in FIG. 11. Neutrals of each winding phase (not shown) of the stator 319 are brought out of the electric motor 304 separately in an open winding topology, such that the electric motor more particularly is an open neutral permanent magnet synchronous motor. A modular H-bridge inverter structure (not shown) with wide bandgap semiconductor FETs (Field Effect Transistors) of the electric motor drive 306, which is described in further detail below, is used in concert with the open winding motor structure and careful pulse width modulation (PWM) control in order to prevent a common mode voltage from being applied to each winding and thus minimize radiated emissions without added filter weight.

To operate at the highest system efficiency, the electric motor 304 is coupled directly to the propeller 308, thus minimizing gearbox weight and efficiency loss. However, a 3000-5000 rpm direct drive application will naturally result in a high pole count motor. That in-turn entails a high fundamental frequency in the range of 1200-2000 Hz that the drive inverter (within the electric motor drive 306) will supply by switching at a high enough PWM (pulse width modulated) frequency in the range of 20 kHz. The windings (not shown) of the stator 319 of the electric motor 304 will therefore see these high frequencies which, if not mitigated, can cause significant losses due to the stator winding skin effect. To eliminate or alleviate this issue, special Litz wires (not shown) designed to minimize skin effect losses can be used to wind the stator 319. Additionally, to minimize eddy current losses within the electric motor 304, the stator 319 employs laminations in a laminations stack (not shown) that are made from a stator steel alloy and that each respectively have a thickness of 1-2 mm.

Further with respect to the motor 304, the rotor (or rotor assembly) 318 will have high grade magnets in a Halbach surface mount arrangement to maximize torque production. There will be some rotor eddy current production that will likely be cooled directly by the air flow around the motor 304. There will be two sets of bearings—namely, axial and thrust. Additionally, in the present alternate embodiment of the propulsion system 302, the topologies of the electric motor 304 and also the inverter within the motor drive 306 (described in further detail below) are designed to minimize common mode voltages in the motor which may eliminate the bearing currents leading to higher reliability. However, in case the bearing currents phenomenon manifests itself, insulated ceramic roller bearings (not shown) can be used. It is expected that the motor 304 can attain a torque density of (or of substantially) 2.2-2.3 Nm/Amp at 100 C magnet and also a winding temperature of (or of substantially) 200 C, which can result in approximately 8 kW/kg and approximately 95% efficiency.

Figure 12:
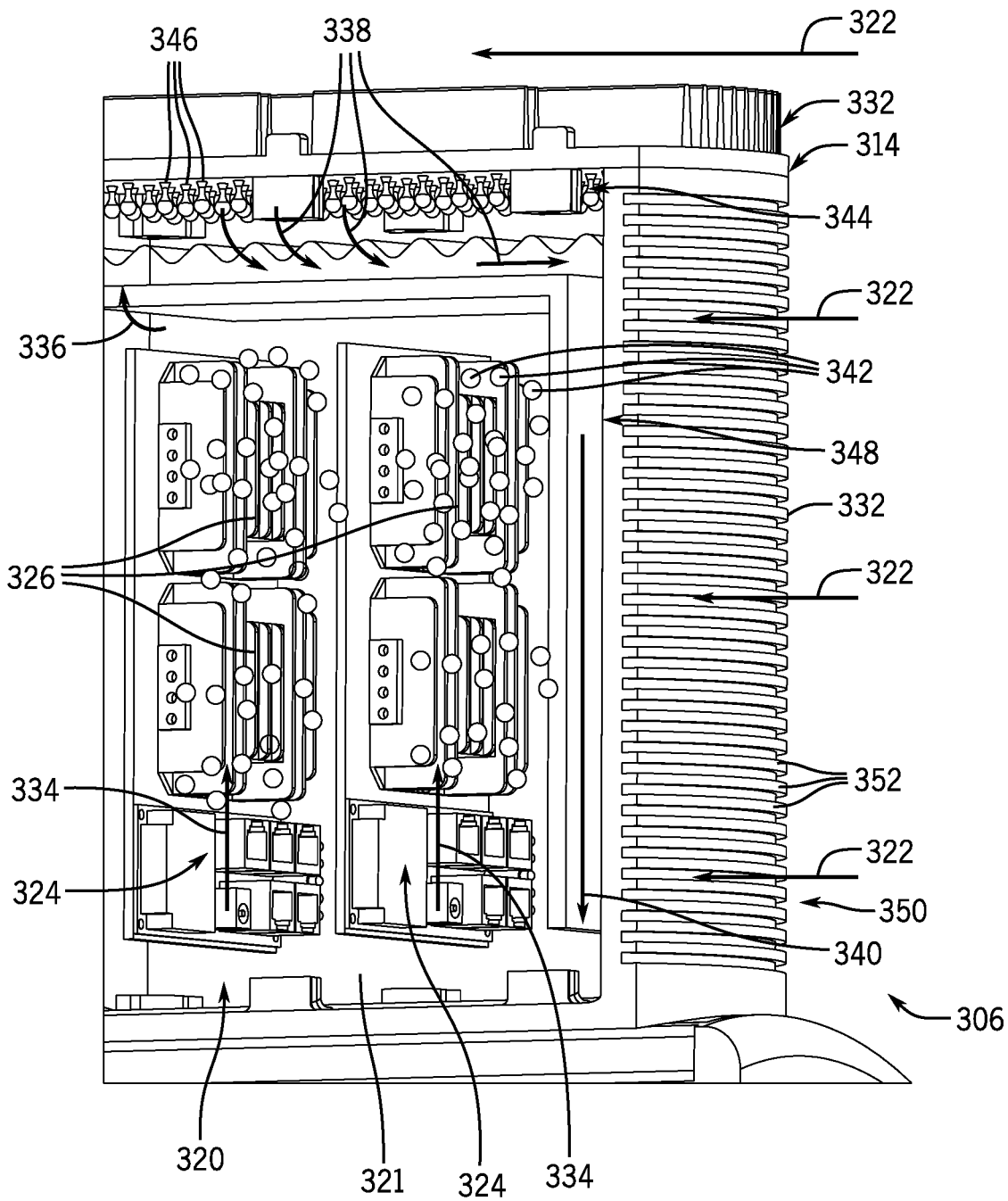
FIG. 12 is a right side, partially-cutaway view of an immersion-cooled electric motor drive of the second propulsion system of FIG. 11.

Referring additionally to FIG. 12, a right side perspective cutaway view of the electric motor drive 306 is provided. The electric motor drive 306 is particularly shown to be cutaway from the electric motor 304 (which would be below the motor drive as shown). Also, FIG. 12 shows the electric motor drive 306 to be missing a right sidewall portion of the motor drive housing 314 so as to reveal various internal components within an interior 320 of the motor drive. The internal components within the interior 320 of the motor drive include control electronics components 324 and power electronics components 326, which can also be considered to form one or more inverters of the electric motor drive 306. It should be appreciated that, during typical operation of the propulsion system 302 (e.g., when implemented on an aircraft), the motor drive 306 will experience air flow along and past (e.g., past the front, over the top and around the sides, toward and past the rear of) the motor drive housing 314 generally in manners represented by arrows 322.

As mentioned above, the propulsion system 302 includes a thermal management system that forms parts of each of the electric motor 304 and the electric motor drive 306. In general, the thermal management system for the propulsion system 302 can be considered to be a passive thermal management system that advantageously provides a low mass penalty, high efficiency, and high reliability. With respect to the electric motor 304, in contrast to the cooling approach for the electric motor 200 discussed above, the cooling approach of the electric motor involves immersion cooling. More particularly, the cooling approach of the stator 319 is for windings in the slots and the end turns (not shown) to be flooded with a strong dielectric cooling liquid. Two composite outer diameter (OD) and inner diameter (ID) sleeves (not shown) are employed to isolate the stator 319 from the airgap, so as to keep the motor airgap free from cooling fluid and its mist.

As shown in FIG. 11, the motor housing 310 includes a plurality of fins 328 that extend aftward along the cylindrical outer surface of the motor housing, front locations (nearer the propeller 308) to rear locations. During typical operation of the propulsion system 302, air flow not only passes by the motor drive housing 314 as represented by the arrows 322 of FIG. 12, but also passes by the motor 304, including the motor housing 310 and fins 328 thereof, as represented by arrows 330. Accordingly, heat transferred to the cooling liquid is removed from the motor 304 as the cooling liquid (and its mist) come into contact with interior surfaces of the motor housing 310 and transferred by conduction to the fins 328, which are then cooled as the air flow passes along the fins 328 and removes heat from the fins.

As for the cooling of the electric motor drive 306, in the alternate embodiment of FIG. 11 and FIG. 12, cooling is performed by way of use of immersion two-phase cooling and a co-packaged heat exchanger. As shown in FIG. 12, the electronic components within the motor drive 306 can be thermally classified into two groups: low power, low temperature electronics that particularly include the control electronics components 324; and high power, high temperature electronics components that particularly include the power electronics components 326. Positioning of the motor drive 306 onto the motor 304 allows for a minimized interconnection length. This allows for external surfaces 332 of the motor drive housing 314 of the motor drive 306 (which during operation can attain for example a maximum temperature, at takeoff on an aircraft, of approximately 200° C.) to come into direct thermal contact with the induced air flow represented by the arrows 322 (for which the maximum temperature is ambient temperature), which is sufficiently below the maximum electrical component temperature to not require an externally powered heat pump.

Internally within the motor drive 306, the cooling process utilizes a cooling loop, which involves liquid convection in addition to a two-phase cooling process (latent heat of phase change) to optimize thermal loss dissipation. This process generally uses liquid convection for cooling of the control electronics components 324 and liquid convection supplemented by evaporative heat transfer for cooling of the power electronics components 326 (higher quality heat). Heat is transferred to the external surfaces 332 of the motor drive housing 314 by vapor condensation in an upper part of the interior 320 of the motor drive 306 (within the motor drive housing 314 or enclosure) and liquid convection within the remainder of the interior of the motor drive (or motor drive housing or enclosure).

Operation of the cooling loop is illustrated in FIG. 12 by arrows 334, 336, 338, and 340. Overall, internal fluid circulation is naturally provided by the differential fluid density due to thermal expansion from temperature increase and further density reduction from vapor bubble inclusion within the liquid flow. More particularly, as illustrated by the arrows 334, the cooling fluid generally moves upward through the interior 320 of the motor drive 306 during operation, as the fluid is heated by the control electronics components 324 and power electronics components 326. The cooling fluid is initially heated as it rises from a bottom or sump 321 of the interior 320 and passes by the control electronics components 324. Then as the fluid continues to move upward toward and past the power electronics components 326, the fluid evaporates and is converted to gaseous form, as represented by vapor bubbles 342. As represented by arrow(s) 336, the cooling fluid, after being converted to gaseous form represented by the vapor bubbles 342, continues to rise upward into a vapor space 344 at the upper part of the interior 320 of the motor drive.

Upon reaching the vapor space 344, the gaseous cooling fluid begins to cool. In the present embodiment, this cooling occurs not only because the gaseous cooling fluid is proximate the exterior of the motor drive housing 314 (near the top of the motor drive housing), but also because of the operation of pins 346 that extend downward from the exterior of the motor drive housing inwardly into the vapor space 344. Due to the presence of the pins 346, heat is more readily transferred by conduction between the vapor within the vapor space 344 as it contacts the pins and the exterior of the motor drive housing 314 by which air flow is passing (as represented by the arrows 322). As the vapor condenses back into cooling fluid in a liquid form at the vapor space 344, the cooling fluid (liquid) then proceeds toward the front of the vapor space and of the interior 320, as represented by arrows 338.

Additionally, upon reaching the front of the interior 320, the cooling fluid reaches a downwardly-extending channel 348, by which the cooling fluid (liquid) can proceed back down to the sump 321, as illustrated by a further arrow 340. As the cooling fluid passes through the downwardly-extending channel 348, the cooling fluid is further cooled due to conduction of heat through a front wall 350 of the motor drive housing 314. As shown, the front wall 350 includes a plurality of horizontally-arranged fins 352 that further enhance the extent to which the air flow passing by the motor drive 306 extracts the heat being dissipated out of the motor drive by way of the cooling fluid. Upon reaching the sump 321, the cooled cooling fluid can again proceed upwards as represented by the arrows 334.

In the present embodiment, the cooling fluid can be a low viscosity, high dielectric strength fluid (preferably proven over decades of use in other electronics cooling applications) such as the FC-43 and NOVEC 7600 fluids available from the 3M Company. The risk of power electronic heat flux density exceeding critical heat flux for a fluid operating condition can be mitigated by the addition of fins (e.g., the fins 352) to the component case for area enhancement, as necessary. The power electronics components 326 are oriented with the primary heat dissipation surface vertical allowing vertically rising liquid (as represented by the arrows 334) to sweep the surface and vapor bubbles 342 to be entrained away. The lower temperature capable control electronics components 324 are located in the lower part of the interior 320 of the motor drive housing 314 (or enclosure) where the coolest fluid is located.

Also in the present embodiment, the interior 320 of the motor drive 306 is charged with a predetermined volume of fluid, and then air and non-condensable gases are removed before sealing. The internal pressure within the interior 320 thus is expected to remain near the vapor pressure at the operating temperature. It should be appreciated that, typically when operated as part of an aircraft as described above, the velocity of external air flow around the motor drive 306 (e.g., as represented by the arrows 322) will increase with motor drive power increases, thus providing increased external cooling as power dissipation increases.

In the present embodiment, the fins 352 can take the form of lightweight folded aluminum fins, with an integrated thermal transfer layer between the motor drive housing 314 and the fins (this can also be the case with respect to the fins 328 provided on the motor housing 310). Although FIG. 12 shows an example arrangement of the fins 352 on the motor drive housing 314, the extent of the fins 352 on or along the external and/or internal surfaces of the motor drive housing can vary depending upon the embodiment. Finned case area enhancement on both the internal and external surfaces can be determined both by way of computation (e.g., by way of computational fluid dynamics (CFD) analysis or finite element analysis (FEA)) and/or experimentation.

Although not shown in detail in FIG. 11 and FIG. 12, the motor drive 306 and motor 304 of the propulsion system 302 have additional features that enhance performance, and particularly cooling performance. The weight and volume of aerospace motor drives is strongly impacted by electromagnetic interference (EMI) considerations. Typically, EMI filter inductors can comprise at least 30-50% of the motor drive weight. Although power transistors have rapidly advanced with the introduction of SiC (Silicon Carbide) and other wide bandgap devices, advances in electromagnetics have been much slower. Given these considerations, in the alternate embodiment of the propulsion system 302, the power train packaging (packaging of the propulsion system overall), the topology of the motor drive 306, and the switching scheme have all been selected in order to eliminate filter inductors typically present.

Additionally, it will be appreciated that differential mode filters are typically designed to meet the power quality requirements of the distribution bus. In the propulsion system 302 application, however, it is intended that a "private" dedicated propulsion distribution bus (for the energy storage and distribution system) be implemented that avoids a need for stringent power quality requirements. For this reason and because the motor windings are connected directly to the motor drive 306 with minimal wire length, no differential mode inductors are employed in the propulsion system 302.

Further, the primary EMI concern for an integrated electric aircraft power train is radiated EMI. Radiated EMI is a strong function of the common-mode voltage produced by the motor drive 306. Given this to be the case, as already mentioned above, the motor 304 of the propulsion system 302 employs an open-winding motor topology and the motor drive 306 particularly includes individual H-bridge drives for each phase. The simple H-bridge topology, with proper PWM application, ensures that the source and return terminals of a given phase are always at opposite voltage potentials and thus the common mode voltage remains zero and no common mode inductor is used in the design. Elimination of the common mode choke is key to achieving the desired power density and is not achievable for a typical 3-phase bridge. The H-bridge also allows the full DC link voltage to be applied to each winding, effectively increasing the ratio of AC output voltage per DC link voltage.

In the present embodiment, it is envisioned that the motor drive 306 will utilize a 1100V DC link and 1700V-rated SiC MOSFETs (metal-oxide-semiconductor field-effect-transistors). The SiC MOSFETs particularly can help with achieving motor drive power density and efficiency goals. Third-quadrant conduction of the MOSFET significantly improves efficiency relative to diode conduction—particularly during reduced current cruise conditions. To reduce interfacial losses, the SiC MOSFET devices will be directly bonded to the electrical terminals of the motor drive 306. This allows for the spreading of heat out of the semiconductors without introducing additional mass into the motor drive 306. The surface area of the terminals will be designed such that the critical heat flux of the cooling fluid will not be exceeded. Further in the present embodiment, control algorithms can be utilized that minimize harmonic currents. Even though magnetic fields created by fundamental frequency stator currents appear as direct current (DC) to the rotor 318 and do not contribute to rotor eddy current losses, harmonic currents create alternating frequency components as seen by the rotor and thus contribute to motor loss. Thus, appropriate use of harmonic control algorithms is a motor drive feature that can reduce or minimize motor loss with zero weight penalty.

Notwithstanding the description provided above, it is intended that the present disclosure encompass a variety of additional or alternate embodiments of systems and methods in addition to, or differing from, the embodiments particularly described above. In some such additional or alternate embodiments, the systems or methods include one or more of the features described above but also include one or more other features. Also, in some such additional or alternate embodiments, the systems or methods include combinations of features from different ones of the embodiments described above, in some cases with or without one or more other features. For example, although the motor drive 306 of FIGS. 11 and 12 is shown to include the pins 346 that facilitate heat cooling/transfer but the motor drive 202 of FIGS. 1 through 10 does not include such pins, in further alternate embodiments encompassed herein the motor drive 202 can be modified to include such pins.

It should be appreciated that a variety of different two-phase-change cooling processes/methods and other cooling processes/methods are encompassed herein. These cooling processes/methods encompassed herein include, for example: (a) immersion cooling using a dielectric fluid that is employed to cool the structure without the addition of a pumped coolant loop (where, in at least some embodiments, the high dielectric strength of the fluid can be utilized to reduce distances between high voltage drive components to achieve high packaging density); (b) a heat pipe approach with condensing end(s) of the heat pipe(s) exposed (at least indirectly) to the airstream; and (c) an oscillating heat pipe approach in which oscillating heat pipe(s) connect meanders in inverter(s) and motor hot regions with the condensing end(s) of the heat pipe(s) exposed (at least indirectly) to the airstream. Also, depending upon the embodiment, the present disclosure is intended to encompass thermal management approaches that can include one, two, or more cooling loops. For example, at least some thermal management approaches encompassed herein can include two compact separate cooling loops for the low temperature and high temperature electronics, thereby optimizing mass and volume penalty by avoiding "oversizing" needed for one cooling loop.

One or more of the embodiments encompassed herein can be advantageous in any of a variety of respects. For example, one or more of the propulsion systems (or one or more of the motor drives or motors encompassed herein) can include any of a variety of forms of thermal management systems (or subsystems) that are passive thermal management systems and that advantageously provide a low mass penalty (reduces overall mass and energy penalty), high efficiency, and high reliability. Use of such a thermal management system can enable the attainment of desired performance of an integrated electric propulsion powertrain, as it can directly impact the achievable power density of the motor and drive. Also, depending upon the embodiment, thermal management systems encompassed herein can achieve any one or more of the following advantageous operational characteristics: (a) high heat fluxes with minimal temperature rise via two-phase heat transfer; (b) higher package densities due to the high dielectric strength of the fluid; (c) operational simplicity, low cost, and high reliability, by utilizing no moving mechanical parts for performing cooling; (d) increased thermal inertia that is tolerant of periods of heat generation/heat rejection mismatch (such as, during an aircraft flight, at the beginning of the take-off roll); and (e) increased vapor production per kW at higher temperatures when it is needed most (due to the properties of coolant that is implemented for cooling purposes), which helps to drive a naturally increased circulation rate.

It is specifically intended that the present invention not be limited to the embodiments and illustrations contained herein, but include modified forms of those embodiments including portions of the embodiments and combinations of elements of different embodiments as come within the scope of the following claims.

What is claimed is:

1. An electric propulsion system comprising:
   an electric motor, wherein the electric motor is a permanent magnet synchronous motor;
   a motor drive coupled to and substantially coaxially-aligned with the electric motor, wherein the motor drive includes an annular motor drive housing within which are each of
     an inverter including a plurality of wide bandgap semiconductor field effect transistors (FETs), and
     a controller coupled at least indirectly to the FETs and configured to control the FETs by way of pulse width modulation (PWM) control; and
   a thermal management subsystem by which at least a first portion of the electric motor and at least a second portion of the motor drive are cooled,
   wherein the thermal management subsystem includes a first subsystem portion that is part of the electric motor, by which the first portion of the electric motor is cooled, and wherein the thermal management subsystem additionally includes a second subsystem portion that is part of the motor drive, by which the second portion of the motor drive is cooled,
   wherein fins are arranged along exterior portions of the motor drive and motor and, during operation of the electric propulsion system, are exposed to air flow,
   wherein the second subsystem portion of the thermal management subsystem operates to provide immersion cooling by way of coolant within the annular motor drive housing,
   wherein the first subsystem portion of the thermal management subsystem provides additional cooling by way of one or more heat pipes,
   wherein each of the immersion cooling and the additional cooling occur by way of heat dissipation via the fins, wherein heat is extracted from the fins due to the air flow, and
   wherein the electric motor includes a fan having propeller blades that extend radially inwardly from a rim portion of the electric motor into an inner flow passage of the electric propulsion system by which at least a first portion of the air flow passes through each of the electric motor and the motor drive during operation of the electric propulsion system.

2. The electric propulsion system of claim 1, wherein the immersion cooling includes immersion two-phase cooling of the motor drive, wherein the coolant is a dielectric fluid and is positioned within an internal chamber within the annular motor drive housing of the motor drive,
wherein the internal chamber is substantially annular, and
wherein a liquid portion of the coolant occupies a first portion of the internal chamber substantially up to a level within the internal chamber, such that a second portion of the internal chamber is occupied by a gaseous material.

3. The electric propulsion system of claim 1, wherein the thermal management subsystem includes a co-packaged heat exchanger, and wherein the thermal management subsystem includes at least one cooling loop and is configured to perform both liquid convection and two-phase cooling.

4. The electric propulsion system of claim 1, wherein the one or more heat pipes includes a first heat pipe having a condensing end that is positioned so as to be exposed to an airstream passing by the electric propulsion system during operation.

5. The electric propulsion system of claim 1, wherein the thermal management subsystem includes at least one oscillating heat pipe that connects the inverter and hot regions of the electric motor with at least one condensing end so as to transport heat from the inverter and hot regions to the at least one condensing end, wherein the at least one condensing end is positioned so as to be exposed to an airstream passing by the electric propulsion system during operation.

6. The electric propulsion system of claim 1,
wherein the wide bandgap semiconductor FETs of the inverter are high power, high temperature power electronics components,
wherein the controller includes low power, low temperature control electronics components,
wherein the controller is positioned vertically below the FETs,
wherein the control electronics components of the controller are cooled by liquid convection,
wherein the FETs of the inverter are cooled by both the liquid convection and also evaporative heat transfer, and
wherein the liquid convection is performed by way of a low viscosity, high dielectric strength fluid.

7. The electric propulsion system of claim 1, wherein the motor drive is directly mounted to the electric motor.

8. The electric propulsion system of claim 1,
wherein neutrals of each winding phase of the electric motor extend outward from the electric motor separately in an open winding topology including a plurality of open windings,
wherein the motor drive has a modular H-bridge inverter structure and includes a plurality of H-bridge drives,
wherein the respective H-bridge drives govern respective amounts of power applied to respective windings of the motor, and
wherein the electrical propulsion system lacks any differential mode inductors and also lacks any common mode inductor.

9. The electric propulsion system of claim 1, wherein the wide bandgap semiconductor field effect transistors (FETs) are Silicon Carbide (SiC) metal oxide semiconductor field effect transistors (MOSFETs) and the MOSFETs are directly bonded to electrical terminals of the motor drive.

10. A vehicle comprising the electric propulsion system of claim 1, wherein the vehicle is selected from the group consisting of an airplane, a helicopter, or a boat.

11. A method of operating an electric propulsion system, the method comprising:
providing the electric propulsion system, wherein the electric propulsion system includes an electric motor, a motor drive, and a thermal management subsystem by which at least a first portion of the electric motor and at least a second portion of the motor drive are cooled, the motor drive being coupled to and substantially coaxially-aligned with the electric motor,
wherein the electric motor is a permanent magnet synchronous motor and wherein the motor drive is coupled to the electric motor and includes each of an inverter including a plurality of wide bandgap semiconductor field effect transistors (FETs), and a controller coupled at least indirectly to the FETs and configured to control the FETs by way of pulse width modulation (PWM) control; and
cooling at least one portion of the electric propulsion system by way of one or both of liquid convection and evaporative heat transfer,
wherein the motor includes a plurality of heat pipes that extend substantially between laminations of the motor and first fins arranged along an exterior surface of a motor housing, and
wherein the cooling of the at least one portion of the electric propulsion system includes dissipating first heat from at least one portion of the motor by the heat pipes so that the first heat is communicated to the first fins,
wherein the motor drive includes an annular motor drive housing having an internal chamber within which are positioned the inverter, the controller, and first coolant both partly in a liquid form below a level and a gaseous form above the level,
wherein the cooling of the at least one portion of the electric propulsion system also includes dissipating second heat from at least one portion of the motor drive by immersion cooling involving the first coolant within the annular motor drive housing, wherein the dissipating of the second heat includes each of:
experiencing the liquid convection when a first portion of the first coolant that is in the liquid form is heated;
experiencing the evaporative heat transfer when either the first portion or a second portion of the first coolant that is in the liquid form evaporates to take on the gaseous form; and
conducting the second heat away from the first coolant through the annular motor drive housing to second fins arranged along an exterior surface of the annular motor drive housing,
wherein the first heat is carried away from the first fins and the second heat is carried away from the second fins due to the first fins and second fins being exposed to an air flow, and
wherein the electric motor includes a fan having propeller blades that extend radially inwardly from a rim portion of the electric motor into an inner flow passage of the electric propulsion system by which at least a first portion of the air flow passes through each of the electric motor and the motor drive during operation of the electric propulsion system.

12. The method of claim 11, wherein the electric propulsion system has an architecture in which the electric motor and motor drive are passively cooled, without using any pumps or compressors, by which the first heat and second heat is removed into a surrounding airstream.

13. The method of claim 11, wherein the cooling of the at least one portion of the electric propulsion system includes two phase change cooling.

14. The method of claim 13, further comprising oscillating heat pipes.

15. The method of claim 11, further comprising:
filling at least partly the internal chamber of the annular motor drive housing with a first amount of the first coolant that is in the liquid form; and
allowing at least a second amount of the first coolant that is in the gaseous form to displace air from the internal chamber.

16. The method of claim 11, wherein the dissipating of the first heat occurs by way of second coolant within the heat pipes.

17. An electric propulsion system comprising:
an electric motor including
an annular motor housing including a plurality of first fins arranged along a first exterior surface of the annular motor housing,
a plurality of motor components including a plurality of laminations, and
a plurality of heat pipes extending substantially between the laminations and the annular motor housing at or proximate to the first fins; and
a motor drive coupled to and substantially coaxially-aligned with the electric motor, the motor drive including
an annular motor drive housing including an internal chamber and a plurality of second fins arranged along a second exterior surface of the annular motor drive housing,
a plurality of electronics components positioned within the internal chamber and including one or more control electronics components and one or more power electronics components, and
coolant positioned within the internal chamber so as to be in contact with the electronics components and with the annular motor drive housing at or proximate to the second fins,
wherein, during operation of the electric propulsion system, first heat is transported by the heat pipes away from the laminations for receipt by the first fins, and second heat is communicated by immersion cooling via the coolant away from the electronics components for receipt by the second fins, the first heat being carried away from the first fins and the second heat being carried away from the second fins due to air flow passing along the electric propulsion system, and
wherein the electric motor includes a fan having propeller blades that extend radially inwardly from a rim portion of the electric motor into an inner flow passage of the electric propulsion system by which at least a first portion of the air flow passes through each of the electric motor and the motor drive during operation of the electric propulsion system.

18. The electric propulsion system of claim 17, wherein the first fins at least in part are arranged along a first inner cylindrical surface of the annular motor housing, wherein the second fins at least in part are arranged along a second inner cylindrical surface of the annular motor drive housing, and wherein the inner flow passage extends through both of the first inner cylindrical surface and the second inner cylindrical surface.

19. The electric propulsion system of claim 18, wherein the motor drive includes a plurality of wide bandgap semiconductor field effect transistors (FETs), wherein the wide bandgap semiconductor FETs are Silicon Carbide (SiC) metal oxide semiconductor field effect transistors (MOSFETs), and wherein the MOSFETs are directly bonded to electrical terminals of the motor drive.

20. A vehicle comprising the electric propulsion system of claim 19, wherein the vehicle is selected from the group consisting of an airplane, a helicopter, or a boat.

* * * * *